United States Patent [19]
Fukuda

[11] Patent Number: 5,764,323
[45] Date of Patent: Jun. 9, 1998

[54] TRANSMISSION TYPE DISPLAY DEVICE WITH ASPHERIC MICROLENSES

[75] Inventor: Toshihiro Fukuda, Kanagawa, Japan

[73] Assignee: Sony Corporation, Japan

[21] Appl. No.: 740,397

[22] Filed: Oct. 29, 1996

[30] Foreign Application Priority Data

Oct. 31, 1995 [JP] Japan ................................. 7-306594

[51] Int. Cl.$^6$ ............................................. G02F 1/1335
[52] U.S. Cl. ..................................... 349/95; 349/5
[58] Field of Search ............................. 349/8, 95, 62

[56] References Cited

U.S. PATENT DOCUMENTS

| | | | |
|---|---|---|---|
| 4,686,519 | 8/1987 | Yoshida et al. | 349/95 |
| 4,836,637 | 6/1989 | Poorman et al. | 385/73 |
| 5,011,254 | 4/1991 | Edwards et al. | 385/33 |
| 5,161,042 | 11/1992 | Hamada | 349/95 |
| 5,359,440 | 10/1994 | Hamada et al. | 349/8 |
| 5,617,152 | 4/1997 | Stolov | 349/62 |
| 5,633,737 | 5/1997 | Tanaka et al. | 349/95 |

*Primary Examiner*—Anita Pellman Gross
*Attorney, Agent, or Firm*—Ronald P. Kananen

[57] ABSTRACT

A transmission type display device to be incorporated in a projector or the like has improved efficiency in condensing incident luminous flux. The transmission type display device includes a pair of transparent substrates which are joined to each other through the intermediation of a predetermined gap and which are equipped with electrodes that form pixels arranged in a matrix-like form. An electro-optical material is held in the gap between the substrates and serves to modulate the G transmittance of the incident luminous flux for each pixel to convert it to an output luminous flux. On the upper transparent substrate, a micro lens having an aspheric configuration is formed and condenses an incident luminous flux on a pixel opening under conditions which reduce the spherical aberration to zero. This micro lens has, for example, an ellipsoidal or a hyperboloidal configuration.

15 Claims, 5 Drawing Sheets

TRANSMISSION TYPE DISPLAY DEVICE WITH ASPHERIC MICROLENSES

BACKGROUND OF THE INVENTION

1. Field of the Invention

The present invention relates to a transmission type display device which is to be incorporated in a projector or the like and, more specifically, to a technique for achieving an improved efficiency in utilizing light from a light source by using a micro lens.

2. Description of the Related Art

Figure 10:
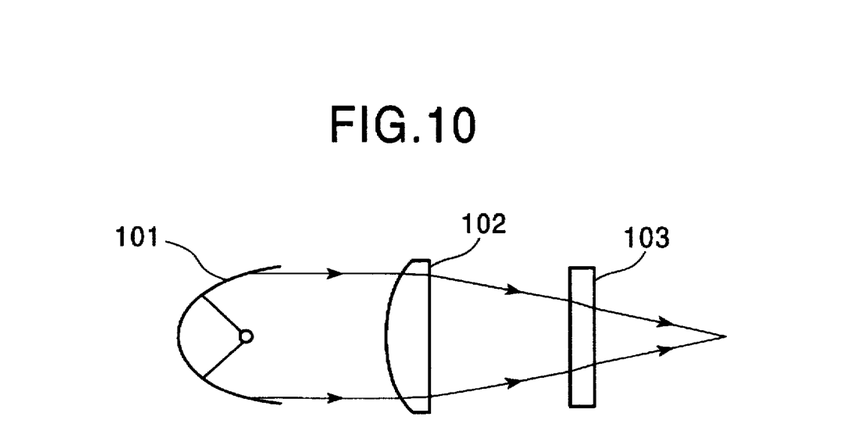
FIG. 10 is a schematic diagram showing an example of a conventional projector that is equipped with a Koehler illumination.

As shown in FIG. 10, in a conventional projector, a light source 101, a convex lens 102, a liquid crystal panel 103, a projection lens (not shown), and a screen (not shown) are arranged in that order along the optical axis. The liquid crystal panel 103 is, for example, of an active-matrix type, and color filters colored in the three primary colors of R (red), G (green) and B (blue) in correspondence with the individual pixels are formed into an integral unit. White light which is emitted from the light source 101 is condensed by the convex lens 102 before it is transmitted through the color liquid crystal panel 103. Further, it is enlarged and projected by the projection lens, and a color image appears on the screen that is situated in front. The structure consisting of a combination of the light source 101 and the convex lens 102 is called a Koehler illumination.

Generally speaking, to enhance the efficiency in utilization of the light source, micro lenses are formed in the liquid crystal panel 103 in correspondence with the individual pixels. The micro lens condenses the light from the light source at the opening of a pixel to reduce the quantity of light that is wasted due to the absorption by a black matrix or the like. Conventionally, micro lenses have been produced by the ion exchange technique, etching, etc. In the ion exchange technique, ions are isotropically diffused in glass from a point on the surface of the glass to thereby effect a local variation in refractive index, thereby forming micro lenses. In the case of etching, glass is etched through minute openings in a resist layer covering the surface of the glass to thereby form concave surfaces. These concave surfaces are filled with a transparent resin or the like whose refractive index differs from that of the glass to thereby form micro lenses. In any case, the diffusion of ions in the ion exchange technique and the etching of glass in the etching method are effected isotropically, so that the micro lenses thus obtained have a spherical configuration. Thus, when the light from the light source is condensed, it cannot be condensed at one point due to spherical aberration, resulting in a deterioration in the efficiency of the micro lens. This tendency becomes more conspicuous as the inclination of the incident light on the liquid crystal panel increases. In particular, in the Koehler illumination, which is generally used in projectors, it sometimes occurs that the micro lenses scarcely function. This tendency is more conspicuous when the size of the liquid crystal panel is further reduced and the definition of the pixels is made higher.

SUMMARY OF THE INVENTION

To solve the above problem in the prior art, in accordance with the present invention, there is provided a transmission type display device comprising: a pair of transparent substrates joined to each other through the intermediation of a predetermined gap, the transparent substrates being equipped with electrodes forming pixels arranged in a matrix-like form; an electro-optical material held in the gap and adapted to modulate the transmittance of an incident luminous flux for each pixel to convert it to an output luminous flux; and a micro lens having an aspheric configuration and adapted to condense the incident luminous flux on the pixels under conditions which reduce the spherical aberration to zero.

In another aspect of the invention, there is provided a color projecting apparatus having: a display panel including: a pair of transparent substrates equipped with electrodes forming pixels arranged in a matrix-like form and joined to each other through the intermediation of a predetermined gap; an electro-optical material held in the gap and adapted to modulate the transmittance of an incident luminous flux for each pixel to convert it to an output luminous flux; and a micro lens having an aspheric configuration and adapted to condense the incident luminous flux on the pixels under conditions which reduce the spherical aberration to zero; and optical means for throwing light on the display panel and projecting the light transmitted through this display panel in an enlarged form.

In accordance with the present invention, the micro lens has an aspheric configuration and is adapted to condense the incident luminous flux on the pixels under conditions which reduce the spherical aberration to zero. Due to the refraction of the micro lens, the incident light from the light source, which would otherwise impinge upon the shielding regions such as the black matrix and the wiring pattern, is condensed exclusively on the openings of the pixels. The micro lenses have an aspheric configuration which is obtained by partly cutting an ellipsoid of revolution or a hyperboloid of revolution. By using a micro lens having such an aspheric configuration, it is possible to focus the incident light substantially at a single point.

DESCRIPTION OF THE PREFERRED EMBODIMENTS

Figure 1A:
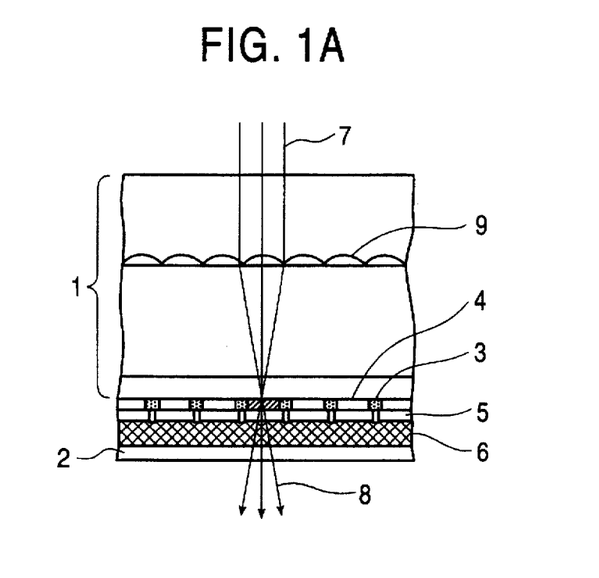
FIG. 1A is a sectional view showing the basic construction of a transmission type display device according to the present invention.

Preferred embodiments of the present invention will now be described in detail with reference to the drawings. FIG.

1A is a schematic sectional view showing the basic construction of a transmission type display device according to the present invention. As shown in the drawing, this transmission type display device is composed of a pair of transparent substrates 1 and 2 which are joined together through the intermediation of a predetermined gap and which are equipped with electrodes forming pixels arranged in a matrix-like form. In the inner face of the upper transparent substrate 1, pixel openings 4 that are surrounded by a black matrix 3 are arranged in a matrix-like form. Further, there is also formed a color filter 5 which is separately colored in the three primary colors of R, G and B in correspondence with the individual pixel openings 4. Further, on the inner surfaces of the transparent substrates 1 and 2, there are also formed transparent electrodes, which, however, are omitted so as to simplify the diagram. An electro-optical material 6 such as liquid crystal is held in the gap between the transparent substrates 1 and 2 and serves to modulate the transmittance of an incident luminous flux 7 for each pixel to convert it to an output luminous flux 8. In the upper transparent substrate 1, micro lenses 9 are formed in correspondence with the individual pixels. These micro lenses 9 have an aspheric configuration and condense the incident luminous flux on the pixel openings 4 under conditions which reduce the spherical aberration to zero. These micro lenses 9 have, for example, an ellipsoidal or a hyperboloidal configuration.

Figure 1B:
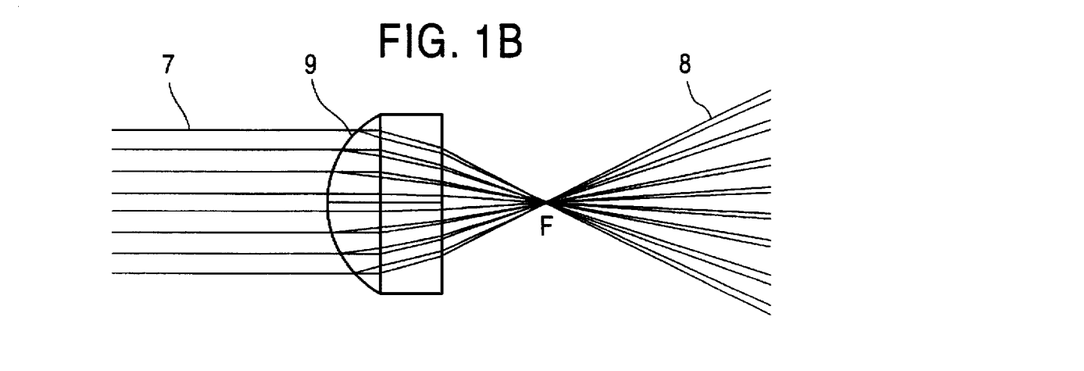
FIG. 1B is a ray tracing diagram of an aspheric micro lens.

FIG. 1B is a ray tracing diagram of the aspheric micro lens 9 having an ellipsoidal surface. It will be seen that, in the case of an ellipsoidal configuration, the incident luminous flux 7 is substantially completely condensed at the focal point F.

Figure 2:
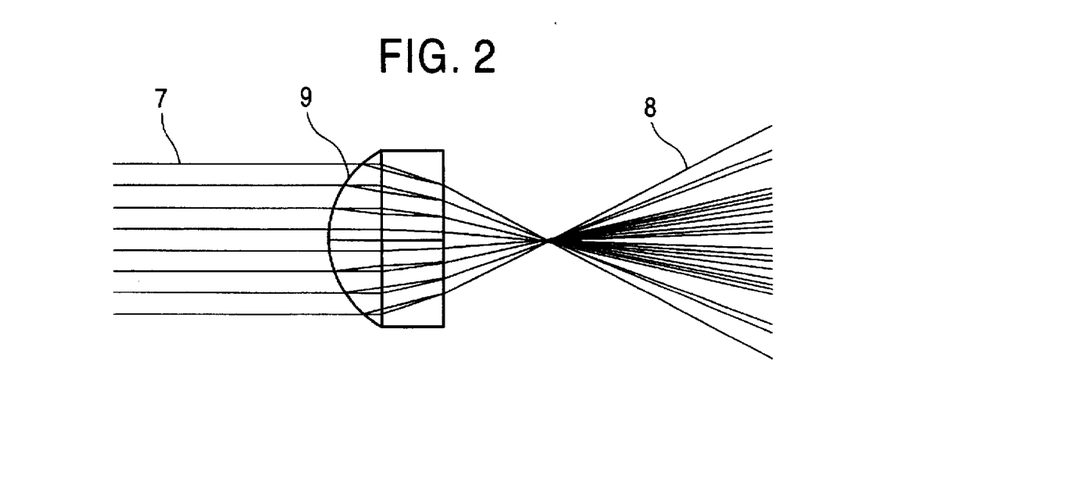
FIG. 2 is a ray tracing diagram of a conventional spherical micro lens.

FIG. 2 is a reference diagram, which is a ray tracing diagram of a micro lens 9 having a convex spherical surface. As will be seen from the drawing, in the case of a convex spherical surface, the luminous flux 7 is not condensed at a single point but is condensed into a spot having a certain expansion.

Figure 3:
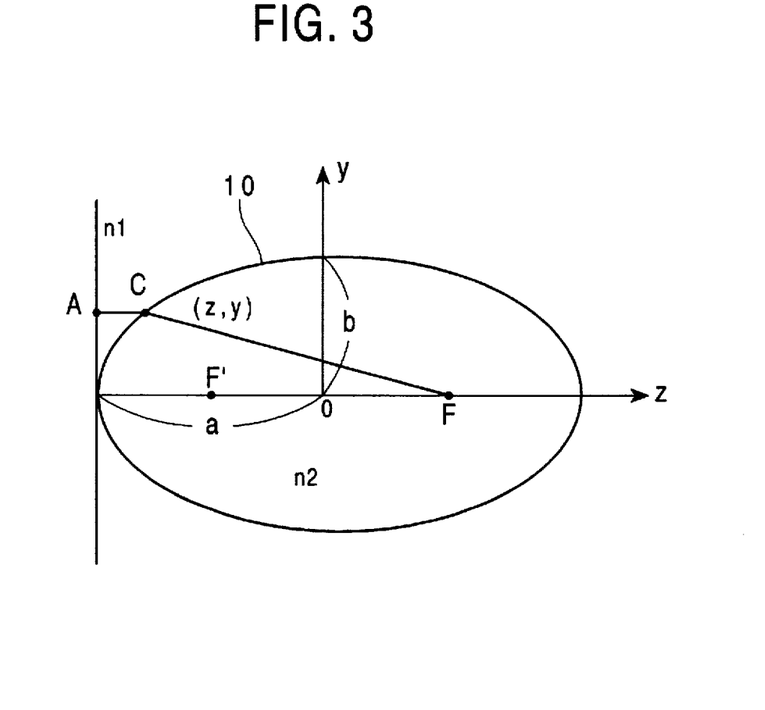
FIG. 3 is a geometrical diagram for illustrating the parameter setting condition for an ellipsoidal micro lens.

With reference to FIG. 3, a parameter setting method for the ellipsoidal surface formed on the micro lens will be described. In the drawing, the refractive index of a substance on the incident side with respect to the ellipsoid 10 is n1, and the refractive index of a substance on the output side with respect to the ellipsoid 10 is n2. In this case, n1<n2. The major-axis radius of the ellipsoid 10 is a, and the minor-axis radius thereof is b. An incident luminous flux which is parallel to the major axis (the z-axis) will be considered. A ray of light will be considered which travels from a point A, which is in a plane that is parallel to the minor axis (the y-axis) and at a distance of a from the axis, to the focal point F by way of a point C. The length of the entire optical path ACF is given by the following formula (1):

$$ACF = \Sigma n \cdot d = n1 \cdot AC + n2 \cdot CF \quad (1)$$

Assuming that the coordinates of the point C are (z, y), AC=a+z. CF is given by the following equation (2):

$$CF = a - \frac{\sqrt{a^2 - b^2}}{a} \cdot z \quad (2)$$

Thus, equation (1) can be transformed as shown in the following equation (3):

$$ACF = n1(a+z) + n2 \left( a - \frac{\sqrt{a^2 - b^2}}{a} \cdot z \right) \quad (3)$$

When the entire optical path length ACF given by this equation (3) is constant with respect to all the points C on the ellipsoid, the incident luminous flux is completely focused at the focal point F. Thus, by differentiating equation (3) with respect to z, a parameter setting condition as indicated by the following equation (4) can be obtained:

$$n1/n2 = \frac{a}{\sqrt{a^2 - b^2}} \quad (4)$$

Thus, the refractive index parameters n1 and n2 and the ellipsoid parameters a and b are to be set so as to satisfy the above equation (4).

Figure 4:
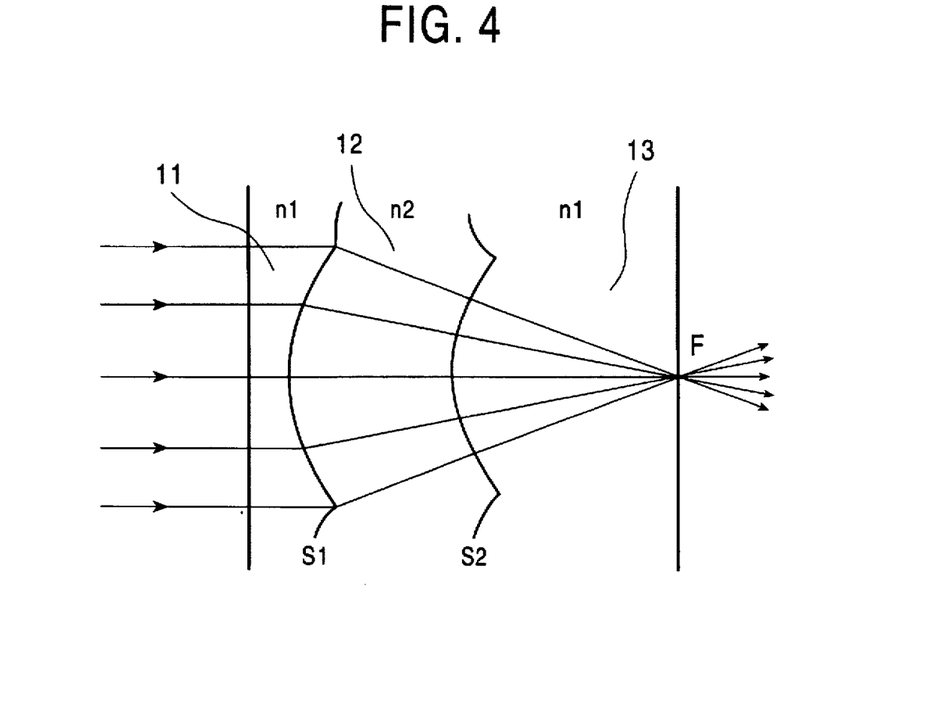
FIG. 4 is a schematic sectional view showing an embodiment of the aspheric micro lens of the present invention.

FIG. 4 shows another embodiment of the micro lens. This micro lens is composed of a glass material 11 having a refractive index of n1, a glass material 12 having a refractive index of n2 and a glass material 13 having a refractive index of n1, and these glass materials are joined together and arranged in that order from the incident side toward the output side. The interface S1 between the glass materials 11 and 12 is an ellipsoidal surface in accordance with the present invention. The interface S2 between the glass materials 12 and 13 is a spherical surface. The focus F is at the center of this spherical surface S2. As to the refractive indexes, n2>n1. In this way, the glass material 13 that is joined to the micro lens composed of the glass materials 11 and 12 is formed so as to have a spherical surface, whereby a non-aberration condition is obtained. Compared with the ellipsoidal micro lens shown in FIG. 2, this embodiment provides a higher efficiency.

Figure 5A:
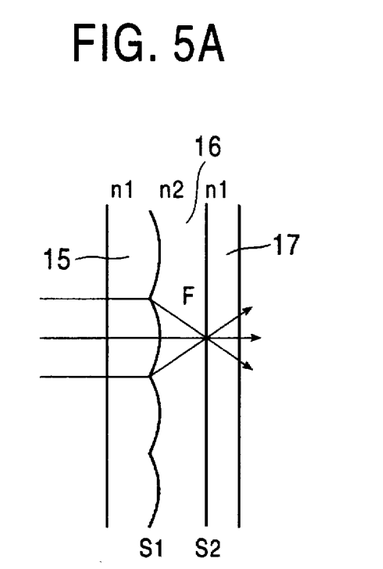
FIGS. 5A and 5B are a sectional view and a geometrical diagram showing another embodiment of the aspheric micro lens of the present invention.

FIG. 5 shows still another embodiment of the micro lens. As shown in FIG. 5A, this micro lens is composed of a glass material 15 having a refractive index of n1, a glass material 16 having a refractive index of n2 and a glass material 17 having a refractive index of n1, which are joined together and arranged in that order from the incident side toward the output side. In this case, n1>n2. The interface S1 between the glass materials 15 and 16 is formed as a paraboloid of revolution. In this embodiment, the magnitudes of the refractive indexes are reversed as compared to those in the embodiment shown in FIG. 4, so that the convex/concave configuration of this paraboloid of revolution is reverse to that of the ellipsoid that is shown in FIG. 4. Further, the interface S2 between the glass materials 16 and 17 is formed as a planar surface. However, this may be replaced by a spherical surface having the focus F as its center.

Figure 5B:
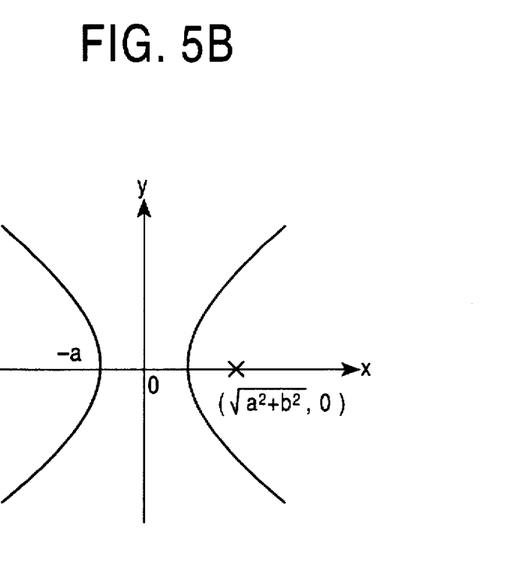

Referring to FIG. 5B, the parameter setting condition for the paraboloid of revolution will be described. The setting condition is calculated in the same manner as that in the case of the ellipsoid described with reference to FIG. 3, and the calculation result is given by the following formula (5):

$$n1/n2 = \frac{\sqrt{a^2 + b^2}}{a} \quad (5)$$

The parameters a and b in equation (5) are included in the formula of the ellipsoid of revolution shown in (B), $x^2/a^2 - y^2/b^2 = 1$.

Figure 6:
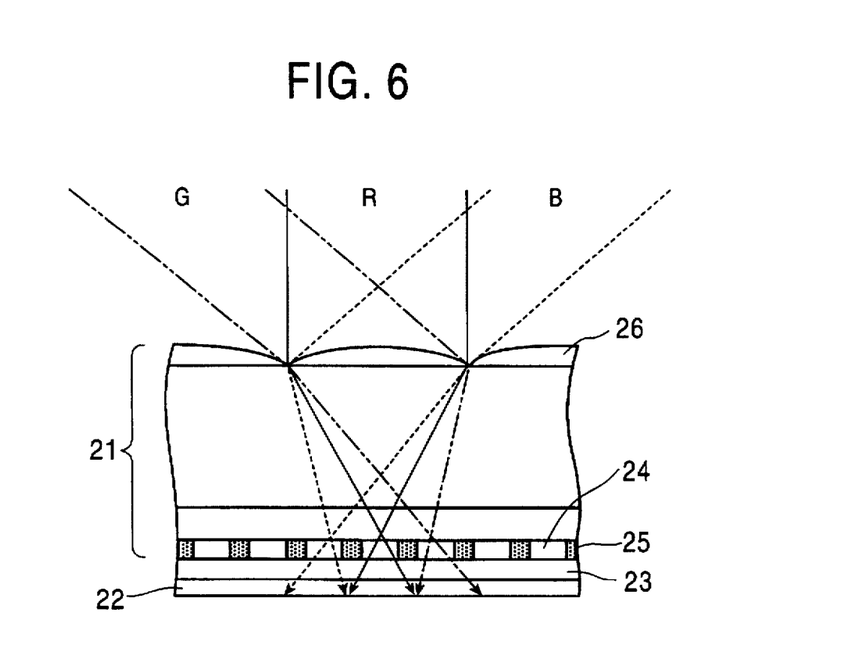
FIG. 6 is a schematic sectional view showing an application example of a transmission type display device according to the present invention.

FIG. 6 shows an application example in which the separation of three-primary-color incident light is effected by a micro lens according to a color-filterless system. This technique is disclosed, for example, in U.S. Pat. No. 5,161,042. As shown in the drawing, the transmission type display device is equipped with an upper transparent substrate 21, a lower transparent substrate 22 and a liquid crystal 23 held between them. In the inner face of the glass substrate 21, there is formed a black matrix 25 which defines pixel openings 24. Unlike the example shown in FIG. 1, this transmission type display device is called a color-filterless system since it provides a color image without using a color filter. Component B separated from white light from a light source (not shown) impinges upon the transmission type display device at a predetermined angle of incidence. Similarly, component R is separated from the white light and impinges upon the transmission type display device at a predetermined angle of incidence. Similarly, component G is separated from the white light and impinges upon the transmission type display device at a predetermined angle of incidence. Relative differences in angle are given between these three-primary-color components R, B and G. In the display device, a micro lens 26 corresponding to each set of pixels consisting of three pixels respectively corresponding to the three-primary-color components R, B and G is provided. This micro lens has an aspheric configuration in accordance with the present invention. Each of the components R, B and G, which impinge upon the device at predetermined angles of incidence, is condensed on the corresponding pixel by the micro lens 26. The components R, B and G which have been transmitted through the respective corresponding pixels are synthesized through a projection lens (not shown), and an enlarged color image is projected onto a screen situated in front. By forming the micro lens 26 in an aspheric configuration, the components R, B and G are condensed on the corresponding pixels with substantial correctness, so that no color mixing occurs. Apart from the color-filter system, the aspheric micro lens is applicable to any other transmission type display device.

Figure 7:
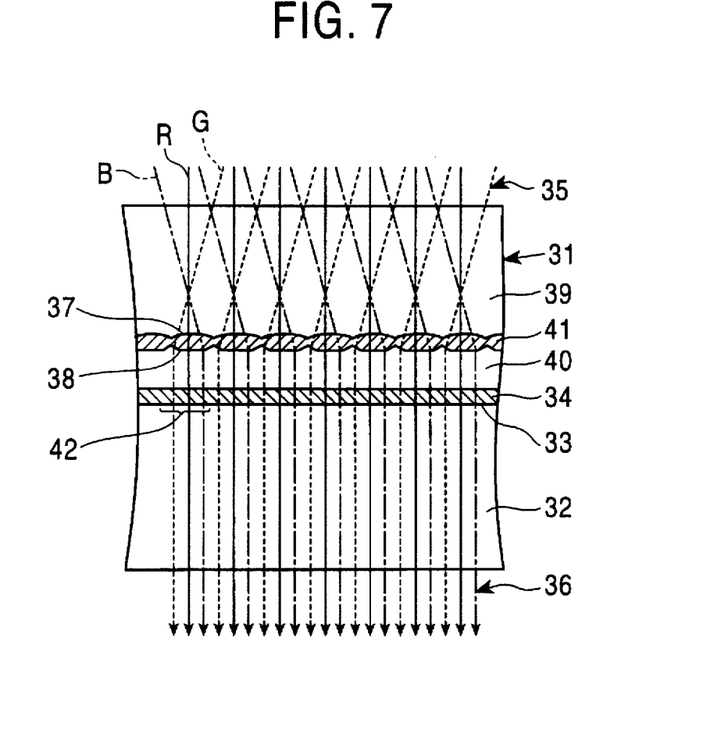
FIG. 7 is a schematic sectional view showing an embodiment in which the micro lenses of a transmission type display device according to the present invention are combined with micro prisms.

FIG. 7 shows a developed form of the color-filterless system shown in FIG. 6. It is a combination of the color separation by the micro lens and the output direction adjustment by a micro prism. As shown in the drawing, this transmission type display device is assembled by using a pair of transparent substrates 31 and 32, and the two substrates are joined together through the intermediation of a predetermined gap. The transparent substrates 31 and 32 have on their opposing inner faces transparent electrodes that are formed by patterning in predetermined configurations. They are superimposed on each other to form pixels arranged in a matrix-like form. In this example, the pixels are separated from each other by a black matrix 33 of lattice-like patterning. An electro-optical material 34 consisting of liquid crystal or the like is held in the gap between the transparent substrates 31 and 32, and the transmittance of an incident luminous flux 35 is modulated for each pixel and converted to an output luminous flux 36. On the incident-side transparent substrate 31, micro lenses 37 having an aspheric configuration in accordance with the present invention and micro prisms 38 are integrally formed. More specifically, an upper glass base material 39, on which the aspheric surfaces of the micro lenses 37 are formed, and a lower glass base material 40, on which the prism surfaces of the micro prisms 38 are formed, are joined together through the intermediation of an adhesive layer 41 to thereby form a laminate-type transparent substrate 31. Along this adhesive layer 41, the micro lenses 37 and the micro prisms 38 are formed. Each micro lens 37 condenses an incident three-primary-color luminous flux (consisting of components R, G and B) toward a corresponding three-pixel set 42. On the other hand, each micro prim 38 is situated between the micro lens 37 and the corresponding three-pixel set 42, and converts an incident luminous flux which is inclined with respect to the optical axis of the micro lens 37 into an incident luminous flux which is substantially parallel to the optical axis. More specifically, the micro prism 38 has a trapezoidal configuration and is equipped with a flat section which allows the first incident luminous flux (component R) that is parallel to the optical axis to travel straight therethrough, a first slope section which makes the second incident luminous flux (component B) that is inclined in one direction parallel to the optical axis, and a second slope section which makes the third incident luminous flux (component G) that is inclined in the other direction parallel to the optical axis.

In accordance with this embodiment, even when a transmission type display device for use in a single-plate type projector of the color-filterless system is reduced in size and enhanced in definition, a bright screen can be obtained. The features of this embodiment is that the micro lens 37 is formed as an aspheric surface and that a refracting surface is provided therebelow. Here, this refracting surface is, as described above, called the micro prism 38. Due to this micro prism 38, only the main optical axes of the components G and B, which are obliquely incident with respect to the pixel after being transmitted through the micro lens 37, are bent, and the main optical axis of the component R, which impinges perpendicularly to the pixel, is not bent. Thus, due to this micro prism 38, it is possible to restrain the angle of divergence of the incident luminous flux that is transmitted through each pixel. As a result, it is possible to increase the luminance of the screen without having to increase the diameter of the projecting lens. That is, the micro prism 38 serves to restrain the shading of light in the projecting lens. When the angle of divergence of the incident luminous flux is large, problems such as color mixing are involved. However, when an aspheric micro lens having high condensing property is used, it is possible to use an incident luminous flux having a large angle of divergence, thereby making it possible to realize a brighter projector. Further, it goes without saying that the aspheric lens can be applied to a color filter system as that shown in FIG. 6 without being combined with a micro prism.

Figure 8:
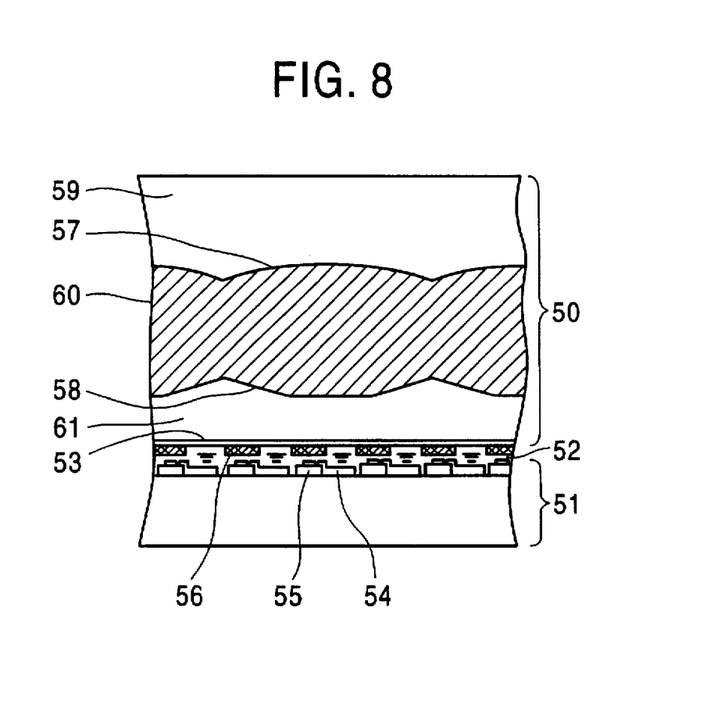
FIG. 8 is a schematic sectional view showing a specific example of the construction of the transmission type display device shown in FIG. 7.

FIG. 8 is a schematic partial sectional view showing a specific construction example of the transmission type display device shown in FIG. 7. This transmission type display device is of an active-matrix type and has a panel structure that is composed of an transparent substrate 50 and a driving substrate 51 which are joined together through the intermediation of a predetermined gap, with a liquid crystal 52 being held in the gap as the electro-optical material. On the entire inner surface of the opposite transparent 50, a transparent opposite electrode 53 is formed. On the other hand, on the inner surface of the driving substrate 51, pixel electrodes 54, which are similarly transparent, are arranged in a matrix-like form. Further, thin-film transistors 55 for driving the pixel electrodes 54 are provided in an integrated form. Between the pixel electrodes 54 and the transparent electrode 53, pixels are defined. The pixels are separated from each other by a black matrix 56 formed on the opposite substrate 50. In some cases, the black matrix 56 is formed on the driving substrate 51 side. The transparent substrate 50 has a laminate structure, which is composed of an upper transparent base material 59 and a lower transparent base material 61, which are joined together through the intermediation of an intermediate transparent adhesive layer 60. Aspheric micro lenses 57 are formed between the upper transparent base material 59 and the intermediate adhesive layer 60, and trapezoidal micro prisms 58 are formed between the intermediate adhesive layer 60 and the lower transparent base material 61.

Figure 9A:
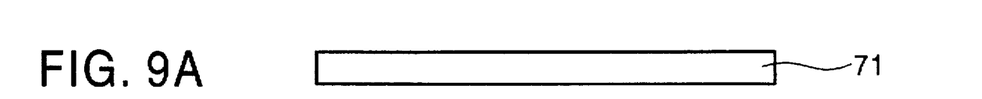
FIGS. 9A through 9E are process diagrams showing a method of preparing aspheric micro lenses, which constitute an essential component of the present invention.
Figure 9B:
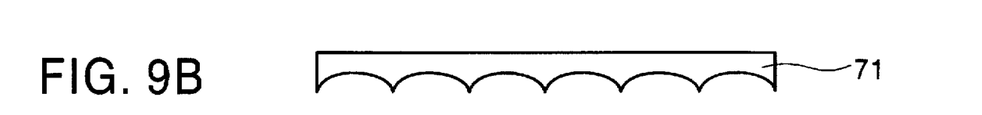
Figure 9C:
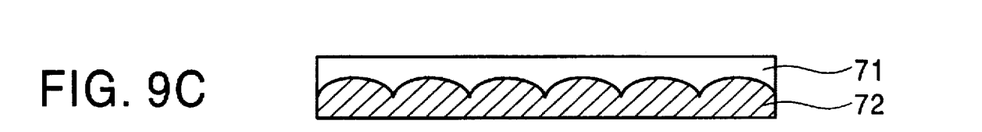
Figure 9D:
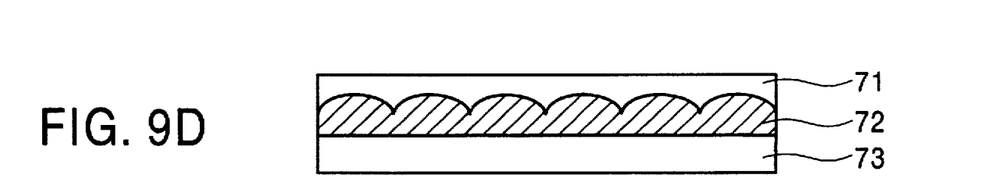
Figure 9E:
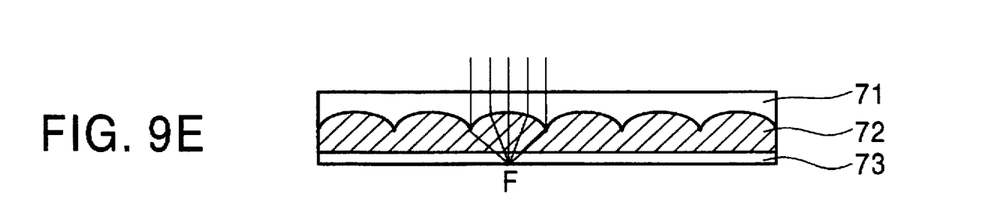

Finally, an example of the method of preparing aspheric micro lenses, which are components constituting a feature of the present invention, will be described with reference to FIGS. 9A through 9E. First, as shown in FIG. 9A, a transparent substrate 71 consisting of quartz, neoceram or the like is prepared. Next, as shown in FIG. 9B, the surface of the transparent substrate 71 is processed into an aspheric configuration by etching or the like. Next, as shown in FIG. 9C, a resin 72 having a refractive index which leads to a non-aberration state in accordance with the above-mentioned parameter setting condition is applied to the surface of the transparent substrate 71 which has undergone etching. This resin also serves as an adhesive. Subsequently, as shown in FIG. 9D, a cover glass 73 is joined to the transparent substrate 71 through the intermediation of the resin 72. Finally, as shown in FIG. 9E, the cover glass 73 is polished such that each pixel opening is aligned with the focal point F when the micro lenses are incorporated in a panel.

As described above, in accordance with the present invention, a micro lens array having an aspheric configuration (ellipsoidal, hyperboloidal, etc.) is mounted in a liquid crystal panel, whereby an improvement is achieved in terms of light condensing property as compared with conventional spherical micro lenses, thereby improving the luminance of a liquid crystal projector or the like. Due to its high light condensing performance, the aspheric micro lens makes it possible to enlarge the margin in the accuracy in substrate registration when assembling the panel. Further, the aspheric micro lens can be applied to the colorless-filter system as it is or in combination with a micro prism, making it possible to achieve an improvement in terms of luminance without entailing color mixing between pixels. In addition, even when the device is applied to a projector of Koehler illumination type, it is possible to achieve an increase in light quantity. Further, it is possible to realize a high-luminance, small-sized projector using a small-sized, high-definition panel.

What is claimed is:

1. A transmission type display device comprising:
   a pair of transparent substrates which are equipped with electrodes forming pixels arranged in a matrix;
   an electro-optical material held between said substrates to modulate the transmittance of an incident beam for each pixel; and
   a plurality of micro lenses through which said incident beam is incident on said pixels, said micro lenses having an aspheric configuration to condense the incident beam on the pixels without spherical aberration.

2. A transmission type display device according to claim 1, wherein said micro lenses have an ellipsoidal configuration.

3. A transmission type display device according to claim 1, wherein said micro lenses are formed by joining together a first glass material having a refractive index of n1, a second glass material having a refractive index of n2 which is smaller than n1 and a third glass material having a refractive index of n1, the first through third glass materials being arranged in that order as from the incident side toward the output side, wherein the interface between the first glass material and the second glass material is an elliptical surface and wherein the interface between the second glass material and the third glass material is a spherical surface.

4. A transmission type display device according to claim 1, wherein said micro lenses are formed by joining together a first glass material having a refractive index of n3, a second glass material having a refractive index of n4 which is larger than n3 and a third glass material having a refractive index of n3, the three glass materials being arranged in that order as from the incident side toward the output side, wherein the interface between the first glass material and the second glass material is a hyperboloidal surface.

5. A transmission type display device according to claim 4, wherein the interface between the second glass material and the third glass material is a planar or a spherical surface.

6. A transmission type display device according to claim 1, further comprising
   a light source for throwing light on a first transparent substrate of said pair of transparent substrates and an optical system for projecting the light transmitted through said pixels in an enlarged form.

7. A transmission type display device according to claim 1, wherein said micro lenses have a hyperboloidal configuration.

8. A color projecting apparatus including a transmission type display device according to claim 1, wherein a color filter colored in the three primary colors is formed on one of said pair of substrates.

9. A transmission type display device comprising:
   a pair of transparent substrates which are equipped with electrodes forming pixels arranged in a matrix;
   an electro-optical material held between said substrates to modulate the transmittance of an incident beam for each pixel;
   a plurality of micro lenses each of which is associated with a group of three of said pixels, said micro lenses having an aspheric configuration to condense the incident beam without spherical aberration; and
   a plurality of micro prisms provided between the micro lenses and the pixels, wherein each micro prism refracts light from an associated micro lens at three predetermined angles depending on a color component of the light, wherein each of said three predetermined angles corresponds to a individual pixel in said group of three pixels.

10. A transmission type display device according to claim 9, wherein said pair of transparent substrates comprise a first and second transparent substrate, wherein said first transparent substrate comprises:
    a first transparent plate on a surface of which said aspherical micro lenses are formed;
    a second transparent plate on a surface of which said micro prisms are formed; and
    a layer of adhesive joining said first and second transparent plates.

11. A transmission type display device according to claim 6, wherein said layer of adhesive is in contact with said surface of said first transparent plate on which said aspherical micro lenses are formed and said surface of said second transparent plate on which said microprisms are formed.

12. A transmission type display device according to claim 9, wherein said micro lenses have an ellipsoidal or a hyperboloidal configuration.

13. A transmission type display device, comprising:
    first and second transparent substrates which are equipped with electrodes forming pixels arranged in a matrix;

an electro-optical material held between said substrates to modulate the transmittance of an incident beam for each pixel; and a plurality of micro lenses each of which is associated with one of said pixels, said micro lenses having an aspheric configuration to condense the incident beam on the pixels without spherical aberration wherein said first transparent substrate comprises an upper transparent plate and a lower transparent plate, wherein the aspheric surface of the micro lenses is formed on a surface of said upper transparent plate which is joined to said lower transparent plate.

14. A transmission type display device according to claim 13, further comprising color filter disposed between said pixels and said electro-optical material.

15. A transmission type display device according to claim 13, wherein said micro lenses have an ellipsoidal or a hyperboloidal configuration.

* * * * *